No. 694,196. Patented Feb. 25, 1902.
G. ROSE.
APPARATUS FOR REPAIRING DRAINS.
(Application filed Aug. 19, 1901.)
(No Model.)
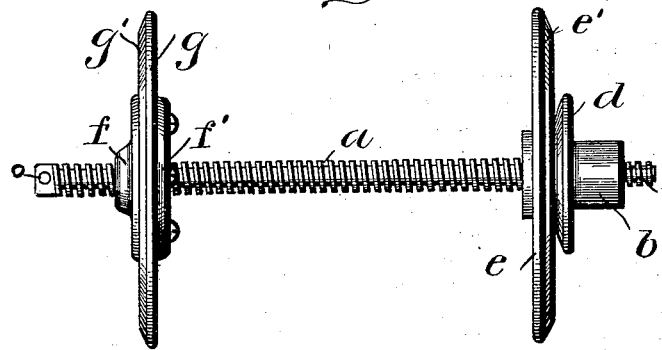
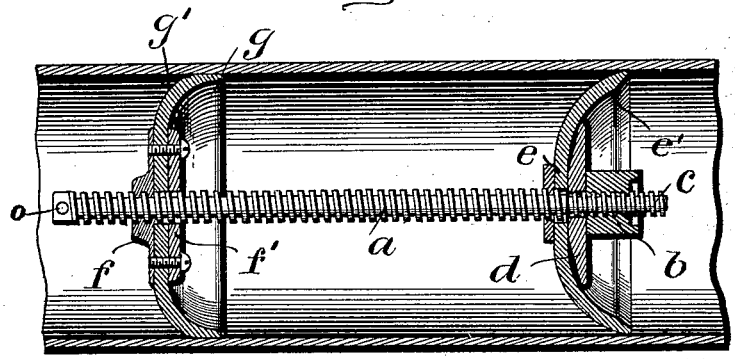
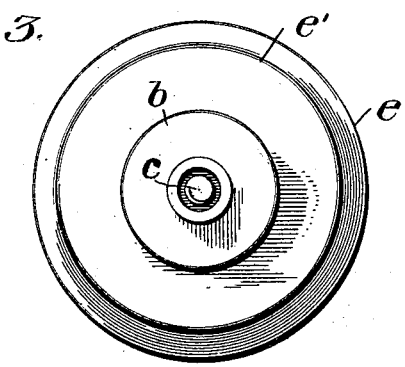
Inventor
G. Rose.
Witnesses

UNITED STATES PATENT OFFICE.

GEORGE ROSE, OF BRIGHTON, ENGLAND.

APPARATUS FOR REPAIRING DRAINS.

SPECIFICATION forming part of Letters Patent No. 694,196, dated February 25, 1902.

Application filed August 19, 1901. Serial No. 72,571. (No model.)

*To all whom it may concern:*

Be it known that I, GEORGE ROSE, a subject of the King of England, residing at 13 Sussex Terrace, Brighton, in the county of Sussex, England, have invented certain new and useful Improvements in Apparatus for Repairing Drains; and I do hereby declare the following to be a full, clear, and exact description of the invention, such as will enable others skilled in the art to which it appertains to make and use the same.

My invention relates to improvements in apparatus for repairing drains, &c., and has among its objects to provide such a device whereby drains may be repaired without disturbing or removing any portion thereof.

Other features of novelty will hereinafter more fully appear upon reference to the accompanying drawings, wherein—
Figure 1 is a side elevation of the device employed for carrying out my said invention; and Fig. 2 is a similar view of the same, showing the device within the drain or pipe. Fig. 3 is an end view of the device.
$a$ represents a screw upon one end of which is carried the socket $b$, provided with the screw-threaded portion $c$ and the beveled or curved collar $d$. The flexible disk or washer $e$ is secured by said socket $b$ next to said collar $d$, the said disk or washer $e$ being provided with the chamfered or beveled edge $e'$. Upon the opposite end of the screw $a$ is mounted the screw-threaded sockets $f f'$, one or both of which may be provided with means for engaging the screw-threads upon said screw. The disk or washer $g$ is clamped or bolted between these sockets $f f'$ in any suitable manner, said disk or washer being provided with the chamfered or beveled edge $g'$.
The end of the screw $a$ may be provided with an eye $o$ for the insertion of a rope or the like.

The hereinbefore-described device is employed as follows: A rope, wire, or the like passing through the section of the drain to be repaired is attached at one end to the eye $o$ of the screw $a$, the disks or washers $e$ and $g$ occupying positions at the ends of the screw $a$. The space between the two disks is then filled with cement or any other suitable material usually employed in repairing drains. The device when thus filled is drawn into the drain to be repaired, the cement occupying the space between the two disks $e$ and $g$ and the walls of the drain. Rods such as are ordinarily employed in cleaning conduits and drains are preferably attached to the screw-threaded socket $c$, the device being forced through the drain by said rods. As the device proceeds through the drain rotary movement is imparted to the socket $b$, which in turn rotates the screw $a$, thereby drawing the two disks $e$ and $g$ together. In this way any crevices or openings or bad joints that may be encountered will be filled up, the drawing together of the two disks acting to force the cement out into such inequalities or faulty joints that may occur.

Having thus described my invention, what I claim, and desire to secure by Letters Patent of the United States, is—

1. In a device of the character described, the combination of a pair of flexible disks adapted to be inserted into a drain or the like, said disks being spaced apart so as to receive a cementing composition between them, and means for drawing said disks together.

2. In a device of the character described, the combination of a pair of flexible disks, adapted to be inserted into a drain, a screw passing through said disks and holding the same at a spaced distance, the space between said disks being adapted to receive a cementing composition, and a socket provided upon one end of said screw adapted to receive a rod or the like for rotating said screw to draw said disks together.

3. In a device of the character described, the combination of a pair of disks of flexible material, a screw between said disks, a socket rigidly mounted upon one end of said screw provided with a screw-threaded socket, a flexible disk carried by said socket, a screw-threaded member mounted upon said screw and a flexible disk carried by said member, whereby the rotation of said screw draws the said disks together.

In testimony whereof I affix my signature in presence of two witnesses.

GEORGE ROSE.

Witnesses:
ARTHUR J. PULLEN,
CHARLES Y. KIFF.